July 15, 1924.
C. A. HOXIE
MEASURING SYSTEM
Filed June 30, 1921
1,501,663
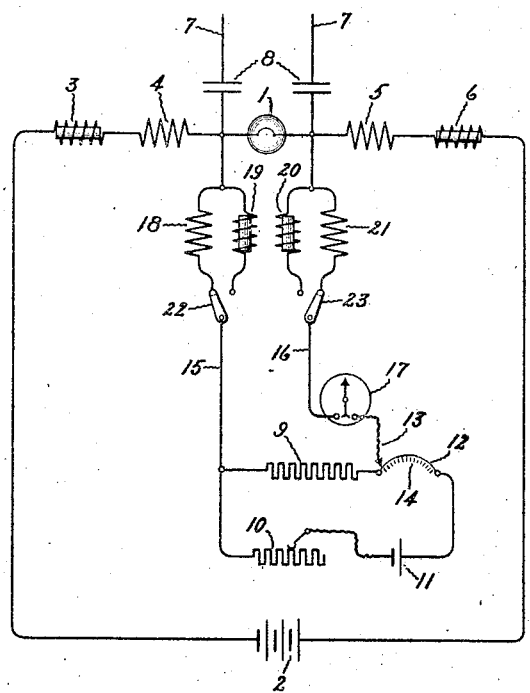
Inventor:
Charles A. Hoxie,
by *Albert G. Davis*
His Attorney.

Patented July 15, 1924.

1,501,663

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

MEASURING SYSTEM.

Application filed June 30, 1921. Serial No. 481,657.

*To all whom it may concern:*

Be it known that I, CHARLES A. HOXIE, a citizen of the United States, residing at Schenectady, in the county of Schenectady, State of New York, have invented certain new and useful Improvements in Measuring Systems, of which the following is a specification.

My invention relates to a measuring system, and more particularly to a system for the measurement of minute alternating currents.

When an alternating current of the order of a few microamperes is to be measured, it is difficult to obtain an accurate measurement of the current value. I have found that with my invention it is possible to measure as small a quantity of current as two microamperes, with comparative ease. This result is due to the particular arrangement of my circuits. With my arrangement I utilize two resistors, one of them made of such material that its resistance varies to a great extent with the amount of current flowing through it, while the other is a manually variable resistance. Through each of these resistances a known direct current is passed. In addition to the direct current the small alternating current to be measured is passed through the first mentioned resistance. I so arrange the circuit that the potential drops of the two resistors are opposed in a series circuit and I furthermore vary the resistance of the manually variable resistor until there is no current flowing in this series circuit. This is an indication that the potential drops are exactly balanced and the amount of resistance in the variable resistor forms an accurate indicator of the value of the alternating current flowing in the other resistor. This method for the determination of small alternating currents is extremely accurate, as found by actual experiment.

For a better understanding of my invention, reference is to be had to the accompanying drawing, in which the single figure is a wiring diagram of the system.

Referring now more in detail to the drawing, the resistor 1 is arranged to carry both the alternating current to be measured as well as a direct current of a known amount. The resistor 1 may be a fine platinum wire of about .07 mils diameter enclosed in an exhausted bulb. This resistor has a variable resistance with variable current flow due to its variation in temperature. The direct current may be obtained from any convenient source; in the present instance the battery 2 is utilized and supplies the resistor 1 with direct current in series with the plurality of inductive coils 3, 4, 5 and 6. These inductive coils are placed in the circuit so as to prevent the alternating current from traversing this path, since as is well known the inductive coils do not appreciably oppose the flow of a direct current, but do oppose the flow of an alternating current. Both air and iron cored coils are used so as to oppose the flow of both low and high frequency currents.

The resistor 1 is also adapted to carry the current to be measured, and for this purpose leads 7 are connected across the resistor 1, which leads form a part of the circuit carrying the alternating current to be measured. In order that no direct current may enter this circuit, I provide condensers 8 in leads 7. It is thus evident that so far as described the resistor carries the current to be measured as well as the direct current supplied by the battery 2, but that there is no appreciable interference between the direct current circuit and the alternating current circuit.

I provide a second resistor 9, preferably manually adjustable. This resistor is in series with an adjustable loading resistor 10 and a source of direct current, such as a battery 11. A portion of the resistor 9 is made up of an arcuate wire 12 of comparatively high resistance along which a contact 13 is arranged to slide so as to vary the amount of resistance between leads 15 and 16, but not to vary the total amount of resistance in the circuit supplied by the battery 11. Along the arc of the resistance element 12 the graduation marks 14 may be provided directly graduated in microamperes or millivolts. By careful choice of resistances 1, 9, 10 and 12 and of the batteries 2 and 11, it is possible to maintain the current flow in the two circuits described at a very uniform value, while no alternating current is being measured.

I provide means whereby the potential drop in resistor 1 is opposed against the potential drop in resistor 9. For this purpose I provide the leads 15 and 16 connecting these two resistors in a local series circuit. The connections are so made that in this series circuit the potential drops of the two resistors are opposed. If the potential drops are unequal, a local current will flow in this circuit. For indicating the condition of flow I provide a sensitive galvanometer instrument 17 in one of the leads 15, 16. I also provide a plurality of inductive coils 18, 19, 20 and 21 so arranged that they may be placed if desired in the leads 15 and 16 so as to prevent interference between the alternating current and the direct currents. The inductive coils 19 and 20 are made with adjustable iron cores, while coils 18 and 21 are air-cored. I so arrange matters by means of switches 22 and 23 that either air-cored coils are in the leads 15 and 16 or iron-cored coils. The air-cored coils are used when high frequency alternating currents are being measured, while the iron-cored coils are used when low frequency alternating currents are being measured so that a large enough reactance will be present to oppose the flow of the alternating current. The switches are provided so as to choose either one or the other of the coils, but not both, and thus to maintain the resistance of the leads 15 and 16 low. Thus the sensitiveness of the closed circuit including the two resistors to changes of potential is maintained.

The mode of operation of my invention is as follows: the circuit comprising battery 2, coils 3, 4, 5, 6, and resistor 1 is adjusted. In the same way the circuit comprising battery 11 and resistors 9, 10 and 12 is also carefully adjusted, and in such a way that the reading on arc 12 with switches 22 and 23 closed, is zero when the galvanometer shows a balance. The alternating current is now fed through the resistor 1 by means of mains 7, 7. If there is a deflection on the instrument 17, the sliding contact 13 is moved to the right to reduce this deflection to zero. The reading on the graduated arc 12 will give the desired value of the current flowing. The alternating current flowing through resistor 1 raises its temperature slightly and thus its resistance so that whereas before the introduction of the alternating current, the instrument 17 may be undeflected, after the current is led therethrough the balance between the potential drops in resistors 1 and 9 is destroyed and the contact 13 as described heretofore must be manually adjusted to restore the balance. This is a very accurate method for determining the current flow through resistor 1, and with careful observation very minute alternating currents may be measured.

While I have shown in the accompanying drawing but one embodiment of my invention, it is evident that it is not limited thereto and I aim to embrace in the appended claims all modifications falling fairly within the spirit and scope of my invention.

What I claim as new and desire to secure by Letters Patent of the United States, is:—

1. A system for measuring alternating currents comprising a resistor the resistance of which is dependent upon the amount of current flowing through it, a direct current source connected to the resistor, said resistor being adapted to be similarly connected in the circuit carrying the current to be measured, means for permitting the resistor only to carry the combined alternating and direct current, a second resistor, means for supplying direct current thereto, and means for balancing the potential drops in the two resistors.

2. A system for measuring alternating currents comprising a single circuit resistor the resistance of which is dependent upon the amount of current flowing through it, means whereby it may carry both a direct current and the current to be measured, and means for balancing the drop of potential across the resistor.

3. A system for measuring alternating currents comprising a resistor the resistance of which is dependent upon the amount of current flowing therethrough, means whereby it may carry both a direct current and the current to be measured, a second resistor, means for supplying said resistor with direct current, means for connecting the two resistors together so that they form a closed path for direct current and so that the potential drops of the two resistors are opposed, and means for varying the value of the second resistor so as to balance the potential drops of the two resistors.

4. In a system for the measurement of alternating currents including a single circuit resistor the resistance of which varies with the amount of current flowing through it, the method of measuring which consists in passing a direct current as well as the alternating current to be measured through the resistor, and balancing the potential drop in the resistor.

5. In a system for the measurement of alternating currents including a resistor the resistance of which varies with the amount of current flowing through it, and another variable resistor, the method of measuring which consists in passing a direct current of known amount as well as the current to be measured through the first resistor, passing a direct current through the second resistor, causing the potential drops in both resistors to be opposed, and varying the second resistor until these drops are equal.

6. A system for measuring alternating currents comprising a resistance element having a resistance variable with the temperature, means for sending a direct current through the resistance, means whereby the current to be measured may also be sent through the resistance so as to heat it, inductive coils in series with said resistance through which coils only the direct current flows, a second resistance, means for sending a direct current through said resistance, means for connecting the two resistances in series so that their potential drops are opposed, inductive coils in the last mentioned series circuit whereby only direct current can pass, and means for varying the second resistance until the potential drops balance.

In witness whereof, I have hereunto set my hand this 29th day of June 1921.

CHARLES A. HOXIE.